Nov. 25, 1958
W. L. BROCK
2,861,466
CONTROL MECHANISM
Filed July 27, 1954
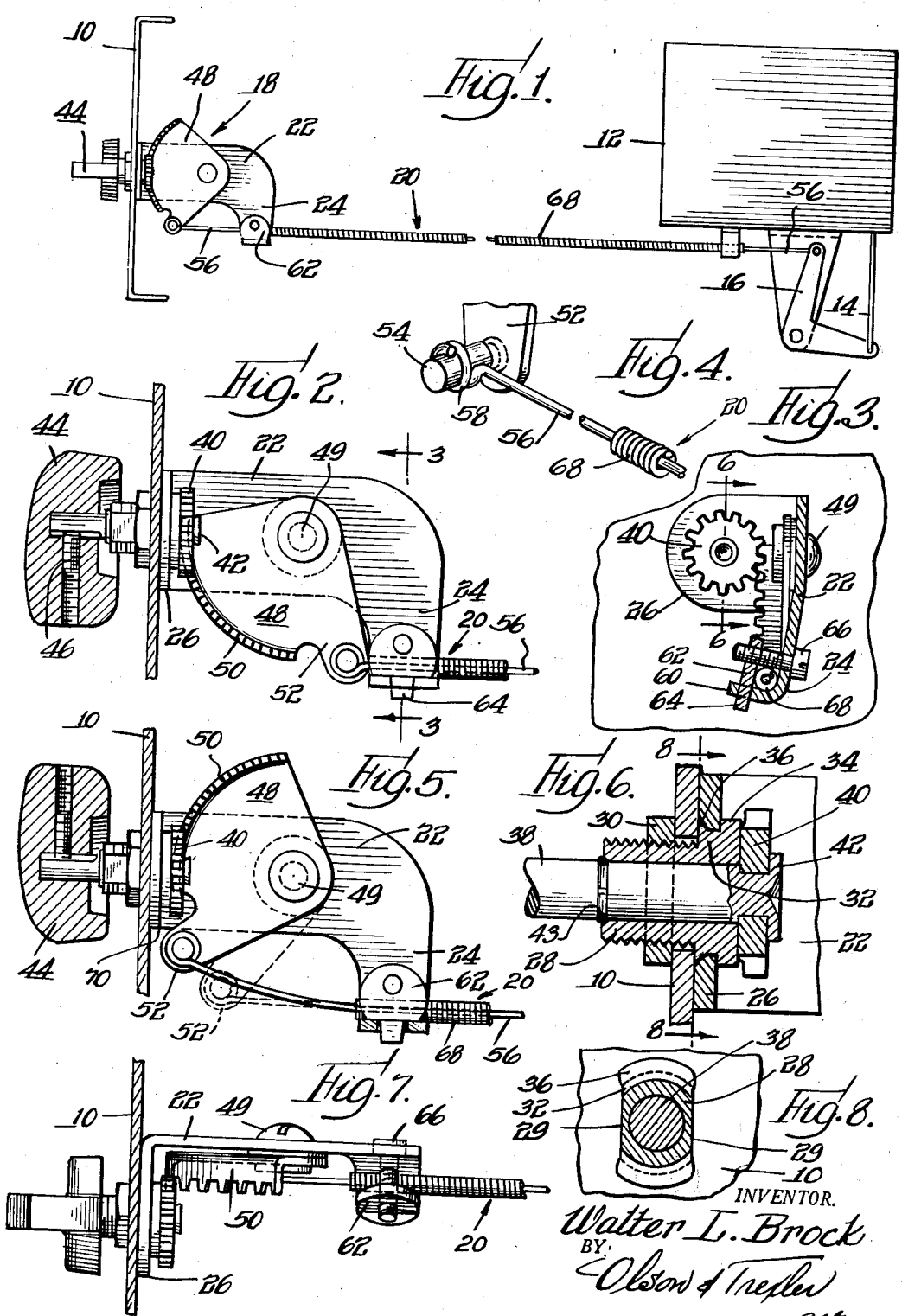
INVENTOR.
Walter L. Brock
BY
Olson & Trexler
attys.

United States Patent Office 2,861,466
Patented Nov. 25, 1958

2,861,466

CONTROL MECHANISM

Walter Laurence Brock, Chicago, Ill., assignor to Arens Controls, Inc., Evanston, Ill., a corporation of Illinois Application July 27, 1954, Serial No. 445,979

13 Claims. (Cl. 74—504)

This invention relates to control mechanisms, and particularly to manual controls for translating rotary into longitudinal reciprocating motion; or for translating longitudinal reciprocating motion into rotary motion, as may be required.

Devices for translating rotary into longitudinal reciprocating motion, or vice versa, as conventionally provided, are subject to the disadvantages that they are low in efficiency and non-uniform in their movements; or they are unduly complex and cumbersome, and thus expensive to produce and difficult to assemble within space requirements or specifications to be met.

Stated broadly, it is an object of the present invention to provide an improved control mechanism, particularly adapted for manual actuation, for translating rotary motion into longitudinal reciprocating motion, or for translating longitudinal reciprocating motion into rotary motion, in a controlled matter. More specifically, it is an object of the invention to provide an improved control mechanism of the foregoing type, which is high in efficiency and uniform in its operation; and which is at the same time inexpensive to produce and assemble, and has satisfactory space requirements.

A further object of the invention is to provide a manual control mechanism, of the foregoing type, which is rugged in character, and which eliminates the necessity for maintenance and adjustment.

A still further object of the invention is to provide a control mechanism of the type set forth, which avoids the difficulties encountered in conventional control mechanisms as heretofore produced.

Various other objects, advantages and features of the invention will be apparent from the following specification, taken in connection with the accompanying drawings, wherein a preferred embodiment of the invention is set forth for purposes of illustration.

In the drawings, wherein like reference numerals refer to like parts throughout:

Fig. 1 is a general assembly view, somewhat diagrammatic in form, of a control installation incorporating a control mechanism constructed in accordance with and embodying the principles of the present invention.

Fig. 2 is an enlarged detail view of the control mechanism of Fig. 1, in a different position;

Fig. 3 is a sectional view of the structure of Fig. 2, on the line 3—3 thereof;

Fig. 4 is a detail perspective view of a part of the mechanism;

Fig. 5 is a view similar to Fig. 2, illustrating the parts in a different position;

Fig. 6 is a further enlarged detail view illustrating the mounting assembly for the handle or control knob;

Fig. 7 is a plan view of the structure of Fig. 5; and

Fig. 8 is a detail view of a part of the handle mounting means, taken as indicated by the line 8—8 of Fig. 6.

In the drawings the invention has been illustrated as applied to a manual control mechanism for effecting a push-pull movement from a rotary control knob, viz., for translating rotary motion into longitudinal reciprocating motion under manual control. It is of course to be understood that by reversal of the operating forces the device equally can be used for translating reciprocating longitudinal motion into rotary motion. It is further to be understood that while the mechanism of the present invention is particularly adapted for use as a manual control, of the type conventionally employed in automobiles, aircraft and the like, the mechanism can be power actuated, if desired.

Referring more particularly to the drawings, in Fig. 1 there is illustrated a control installation comprising a support panel 10 which may, for example, be the dashboard of an automobile, and a device 12 to be operated. In the particular embodiment illustrated the device 12 may comprise an automobile heater, having a reciprocable valve actuator 14, operated by a bell-crank 16.

The control mechanism of the present invention comprises an operating mechanism 18, and an elongated Bowden wire, generally indicated by the reference numeral 20, which may be of any suitable conventional structure.

More specifically, the device comprises a support bracket having a main body portion 22, a depending leg portion 24, and an annularly bent flanged portion 26, Fig. 7, adapted to abut and be secured to the dashboard or support panel 10.

The means for securing the support bracket in position is best shown in Fig. 6, and comprises a threaded bushing 28 extending through a suitable opening in the support panel, and secured thereto by a nut 30. As shown at 29 in Fig. 8, the stud is flattened on its opposite sides and fits into a cooperative opening in the support panel 10, so as to be non-rotatably secured. The stud is provided with a smaller shoulder portion 32 for holding the stud in respect to the support panel 10, and with a larger shoulder portion 34. The shoulder 32 is staked as indicated at 36, this staked portion cooperating with the shoulder 34 so as to tightly grip the bracket flange 26, and connect the bracket and stud as in effect an integral unit.

The bushing 28 rotatably carries an operating handle shaft 38 to the end of which is secured a gear 40. The latter is non-rotatably secured to the shaft by a peened-over end 42 of the shaft. A split snap ring 43 lies within a companion groove in the shaft, so as to anchor the shaft against longitudinal movement within the stud 28.

The outer or opposite end of shaft 38 carries the handle or control knob 44, Fig. 2, secured in position to a flattened portion on the shaft, by a set screw 46. It will be seen that by reason of the foregoing construction, in manufacturing assembly operations the support bracket flange 26 may first be integrally connected with the bushing 28 by the staking 36, for convenience of handling. The shaft 38, to which the gear 40 has previously been secured, may then be slipped into the bushing and held in position by the snap ring 43. The complete assembly may then be mounted into the support panel 10, by the manipulation of the holding nut 30.

Gear 40 cooperates with a flange sector 48, pivotally mounted on the body 22 of the support bracket by means of a stud 49. The flanged portion 50 of the sector is provided with teeth cooperable with the teeth of the gear. As best shown in Fig. 4, sector 48 is provided with a arm 52 to which is secured a stud 54. This stud cooperates with and operates the movable element or wire 56 of the Bowden wire structure 20, the end of the wire being provided with a plurality of turns, as indicated at 58, gripping but rotatably journalled upon the stud.

As best shown in Fig. 3, the leg portion 24 of the support bracket is bent slightly laterally so as to align with the wire 56, and is angularly bent at its terminal portion 60 for cooperation with a clamping plate 62, The latter is provided with an extension 64 which projects through an opening in the bracket portion 60, the plate being secured by a screw 66 into gripping engagement with the sheath portion 68 of the Bowden wire structure.

By reason of the construction provided, it will be seen that as the control knob 44 is manipulated and the gear 40 rotated, the sector 48 will be oscillated to impart longitudinal reciprocating movements to the wire 56. By reason of the journalled connection between the wire and the sector stud 54, it will be seen that the parts move freely, without binding. At the counterclockwise limit of movement of the sector, as shown in Fig. 2, the sector arm 52 engages the support bracket arm 24 as a stop; and at the limit of its clockwise movement the sector arm engages the flange of the support bracket at the point indicated by the reference numeral 70 in Fig. 5. As the sector is shifted, it will be seen that only within a short range at the clockwise limits of its movement, viz., between the full and dotted line positions in Fig. 5, is any substantial bending imparted to the wire 56. During substantially the greater portion of the sector movement, there is substantially no bending motion imparted to the wire. In this way the parts are further kept from binding.

The sector and gear operation provides high efficiency and uniform torque throughout the operating range, and the end of the wire 56 moves substantially horizontally so as not to interfere with the uniform torque relationship. The structure may be readily fabricated and assembled, and when in mounted position requires no adjustment.

It is obvious that various changes may be made in the specific embodiment set forth without departing from the spirit of the invention. The invention is accordingly not to be limited to the specific embodiment shown and described, but only as indicated in the following claims.

The invention is hereby claimed as follows:

1. A manually operable control mechanism adapted to be mounted on a panel such as a dashboard of a vehicle, comprising a support bracket having a flange engageable with the inner surface of the panel and an angularly disposed body portion, a bushing assembled with said flange and having a portion extending outwardly of the flange for projection through an opening in the panel, and having an outer end portion adapted to receive a complementary fastening member engageable with an outer surface of the panel for clamping the panel between the fastening member and said flange, thereby to mount the bracket on the panel, a shaft journalled in said bushing, a gear carried by the shaft, a toothed sector pivotally mounted on the bracket body portion, said sector having a sheet material body and an arcuate sheet material flange thereon substantially perpendicular to said body, the edge of said sheet material flange remote from said body having sector teeth, the teeth of the sector being engaged with the gear, and a force transmission mechanism connected to the sector for movement therewith.

2. A manually operable control mechanism adapted to be mounted on a panel such as a dashboard of a vehicle, comprising a support bracket having a flange engageable with the inner surface of the panel and an angularly disposed body portion, a bushing assembled with said flange and having a portion extending outwardly of the flange for projection through an opening in the panel, and having an outer end portion externally threaded to receive a complementary threaded nut engageable with an outer surface of the panel for clamping the panel between the nut and flange, thereby to mount the bracket on the panel, a shaft journalled in said bushing, a gear carried by the shaft, a toothed sector pivotally mounted on the bracket body portion, said sector having a sheet material body and an arcuate sheet material flange thereon substantially perpendicular to said body, the edge of said sheet material flange remote from said body having sector teeth, the teeth of the sector being engaged with the gear, and a force transmission mechanism connected to the sector for movement therewith, said bushing further including a staked abutment portion adapted for fixed interconnection with said flange whereby said bushing is non-rotatably held in said flange and said bracket is preassembled with said bushing prior to mounting said stud and bracket on said panel.

3. A manually operable control mechanism adapted to be mounted on a panel such as a dashboard of a vehicle, comprising a support bracket having a flange engageable with the inner surface of the panel and an angularly disposed body portion, a bushing assembled with said flange and having a portion extending outwardly of the flange for projection through an opening in the panel, and having an outer end portion adapted to receive a complementary fastening member engageable with an outer surface of the panel for clamping the panel between the fastening member and said flange, thereby to mount the bracket on the panel, a shaft journalled in said bushing comprising a central bearing surface cooperable with said bushing, one end of said shaft being of reduced diameter to receive an apertured gear, said gear being fixedly attached to said shaft by peening over the end of said shaft external of said gear, a recess in said shaft intermediate its ends adapted to receive a snap ring whereby said ring retains said gear against one end of said bushing, the other end of the shaft being adapted to receive a handle, a gear carried by the shaft, a toothed sector pivotally mounted on the bracket body portion, the teeth of the sector being engaged with the gear, and a force transmission mechanism connected to the sector for movement therewith.

4. A manually operable control mechanism adapted to be mounted on a panel such as a dashboard of a vehicle, comprising a support bracket of sheet material having a body portion, an arm portion depending from said body portion and a flange portion angularly disposed from said body portion engageable with the inner surface of the panel, a shaft journalled in said flange portion, a gear carried by the shaft, a toothed sector pivotally mounted on the bracket body portion, the teeth of the sector being engaged with the gear, a Bowden wire structure comprising a transmission wire and a sheath, an anchor member on the sector to which the wire is connected, and an anchor member on the arm portion of said bracket to which said sheath is connected, said anchoring members being in alignment axially of the Bowden wire structure.

5. A control mechanism of the type set forth in claim 4 wherein stops are provided on the support bracket for limiting movement of the sector at its oposite directions of travel.

6. A control mechanism of the type set forth in claim 5 wherein the stops on said bracket include the lower edge of said flange portion and the forward edge of said depending arm portion.

7. A control mechanism of the type set forth in claim 4 wherein said sheath anchoring member includes a flange portion angularly disposed relative to said depending arm portion of said bracket, said flange provided with an aperture adjacent the free end thereof, a plate provided with a threaded aperture adjacent one end thereof and a projection on the other end thereof adapted to fit in the aperture in said flange portion, and a threaded screw extending through an aperture in said arm portion and engageable with the threaded aperture in said plate whereby tightening said screw forces said plate against said sheath thereby anchoring the same.

8. A manually operable control mechanism adapted to be mounted on a panel such as a dashboard of a vehicle, comprising a support bracket of sheet material having a body portion, an arm portion depending from said body portion, and a flange portion angularly disposed from said body portion engageable with the inner surface of the panel, a bushing assembled with said flange and having a portion extending outwardly of the flange for projection through an opening in the panel, and having an outer end portion adapted to receive a complementary fastening member engageable with an outer surface of the panel for clamping the panel between the fastening member and said flange, thereby to mount the bracket on the panel, a shaft journalled in said bushing, a gear carried by the shaft, a toothed sector mounted on the bracket body portion, the teeth of the sector being engaged with the gear, and a force transmission mechanism connected to the sector for movement therewith including a Bowden wire structure comprising a transmission wire and a sheath, said wire connected to said sector and said sheath connected to said arm portion of said bracket.

9. A manually operable control mechanism comprising a support bracket adapted to be secured to the back of a panel, a shaft journaled in said bracket and extending therefrom for projection through the panel, a gear fixed to the inner end of said shaft, a sector pivotally mounted on said bracket and including an array of teeth arcuately disposed about the pivotal mounting of the sector and meshing with the teeth of said gear, said sector having a portion adjacent one end of the arcuate array of teeth provided with attachment means, a push-pull control member connected to said attachment means and movable with the sector upon rotation of the shaft, the gear carried thereby, and the meshing array of teeth on the sector; and said bracket being provided with spaced abutment means cooperating with the sector to confine movement of the sector within limits maintaining meshing engagement between the sector teeth and the gear and effecting substantially rectilinear motion of the control member throughout the major portion of its movement with minimum bending thereof.

10. A manually operable control mechanism as claimed in claim 9, wherein the portion of the sector carrying the attachment means comprises an arm extending radially with respect to the pivotal mounting of said sector and beyond the sector teeth for cooperation with said abutment means.

11. A manually operable control mechanism as claimed in claim 10, wherein the bracket includes an angularly disposed portion remote from said gear and providing one of the abutment means for cooperation with the arm on said sector in limiting movement thereof in one direction.

12. A manually operable control mechanism as claimed in claim 9, wherein the bracket includes an angularly disposed portion remote from said gear and providing one of the abutment means for cooperation with the sector in limiting movement thereof in one direction.

13. A manually operable control mechanism as claimed in claim 9, wherein the control member comprises a sheath and a transmission wire movable therein, and wherein the bracket includes a portion projecting from the body thereof and serving as one of the abutment means for limiting movement of the sector in one direction and carrying attachment means for said sheath.

References Cited in the file of this patent

UNITED STATES PATENTS

| | | |
|---|---|---|
| Re. 21,623 | Bacon | Nov. 19, 1940 |
| 806,708 | Perry | Dec. 5, 1905 |
| 1,260,464 | Shakespeare et al. | Mar. 26, 1918 |
| 1,426,686 | Troup | Aug. 22, 1922 |
| 1,658,554 | Denyes | Feb. 7, 1928 |
| 2,171,073 | Winning | Aug. 29, 1939 |

FOREIGN PATENTS

| | | |
|---|---|---|
| 38,203 | France | July 28, 1931 |
| 853,023 | France | Nov. 18, 1939 |
| 828,940 | Germany | Jan. 21, 1952 |